United States Patent [19]

Koai

[11] Patent Number: 5,002,354
[45] Date of Patent: Mar. 26, 1991

[54] HIGH-EXTINCTION 2×2 INTEGRATED OPTICAL CHANGEOVER SWITCHES

[75] Inventor: Kwang T. Koai, Acton, Mass.

[73] Assignee: GTE Laboratories Incorporated, Waltham, Mass.

[21] Appl. No.: 422,252

[22] Filed: Oct. 16, 1989

[51] Int. Cl.⁵ .............................................. G02B 6/10
[52] U.S. Cl. .............................. 350/96.14; 350/96.13
[58] Field of Search .............. 350/96.10, 96.12–96.14

[56] References Cited

U.S. PATENT DOCUMENTS

| | | | |
|---|---|---|---|
| 4,011,543 | 3/1977 | Soref et al. | 350/96.13 |
| 4,787,692 | 11/1988 | Spanke | 350/96.16 |
| 4,811,210 | 3/1989 | McAulay | 350/96.13 X |
| 4,852,958 | 8/1989 | Okuyama et al. | 350/96.13 |
| 4,883,334 | 11/1989 | Chiarulli et al. | 350/96.13 |
| 4,932,735 | 6/1990 | Koai | 350/96.13 |
| 4,932,736 | 6/1990 | Su | 350/96.14 |

Primary Examiner—Akm Ullah
Attorney, Agent, or Firm—Victor F. Lohman, III; James J. Cannon, Jr.

[57] ABSTRACT

An integrated optical 2×2 changeover switch having four waveguide directional couplers has two wageguide directional couplers cascaded in each path from a port on one side to a port on the other side. Only two electrodes control the switch states of all four couplers. Crosstalk is guided to unused ports of the directional couplers. The extinction ratio is the sum of the extinction ratios of the cascaded couplers in its path. Additional waveguide couplers can be placed in the path of the crosstalk to improve the extinction ratio further.

10 Claims, 3 Drawing Sheets

HIGH-EXTINCTION 2×2 INTEGRATED OPTICAL CHANGEOVER SWITCHES

BACKGROUND OF THE INVENTION

This invention pertains generally to the field of integrated optical components for use in fiber optic communications systems, and more particularly it relates to photonic switching. Specifically, the invention is a two-input/two-output integrated optical changeover switch with a very high extinction ratio.

Optical 2×2 changeover switches are known in the art and serve as key components for building photonic systems such as one-sided switching networks, two sided switching networks and Benes networks. Currently, the most favorable technology for fabricating optical changeover switches is integrated optics. Many integrated optical devices have been used, or suggested to be used, as 2×2 changeover switches. Some examples are directional couplers, reverse delta-beta couplers, cross-switches and BOA-couplers. It is well known in the art that the performance of photonic systems made from these conventional integrated optical devices is limited by the accumulated loss and crosstalk. Only simple systems can be built currently. However, recent progress in optical amplifier technology has demonstrated that optical amplifier gain can compensate for this optical loss. If the use of optical amplifiers in optical systems proves practical, the remaining limiting factor for building more sophisticated optical systems is crosstalk.

It is obvious that optical system crosstalk can be reduced by using optical switches with higher extinction ratios. However, the routine fabrication of conventional integrated optical switches with very high extinction ratios still remains a problem area. Extremely tight control of the fabrication process is required.

SUMMARY OF THE INVENTION

The principal object of the present invention is to provide integrated optical circuitry for optical switching whose fabrication process is more feasible and more economical than that presently available.

It is a further object of the invention to provide a very-high-extinction integrated optical 2×2 changeover switch using currently available fabrication technologies.

A still further object of the invention is to provide integrated optical switches which avoid the above noted and other disadvantages of the prior art.

In a first aspect of the invention, a 2×2 integrated optical changeover switch with a very high extinction ratio is an integration of four waveguide directional couplers controlled by only one pair of electrodes. The waveguide couplers are cascaded pairwise for both the bar and cross states. In the bar state, a first port on one side of the switch communicates with a second port on the second side of the switch through two cascaded waveguide directional couplers, and a third port on said first side communicates with a fourth port on said second side through the other two cascaded waveguide directional couplers. In the cross state, the first port communicates with the fourth port and the third port communicates with the second port with two cascaded waveguide directional couplers in each path. Each waveguide directional coupler has one unused port. In the bar state, crosstalk is dissipated on the changeover path and guided to an unused port. In the cross state, crosstalk is dissipated on the straight-through path and also is guided to the unused ports.

In a second aspect of the invention, the extinction ratio for one operational state can be improved by placing additional cascaded waveguide directional couplers in the crosstalk path of that state.

DESCRIPTION OF THE PREFERRED EMBODIMENTS

Figure 1A:
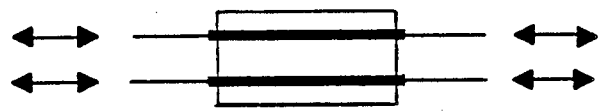
FIGS. 1a and 1b illustrate the bar and crossover states respectively of integrated optical switches.
Figure 1B:
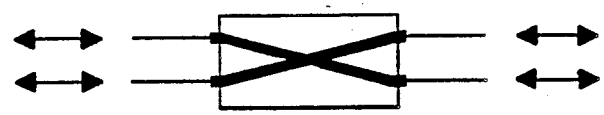

An optical 2×2 changeover switch has two operational states for its two-input/two-output ports, namely, the bar and the cross states, as illustrated in FIGS. 1a and 1b respectively. The bar state is also known as the straight-through state.

Figure 2:
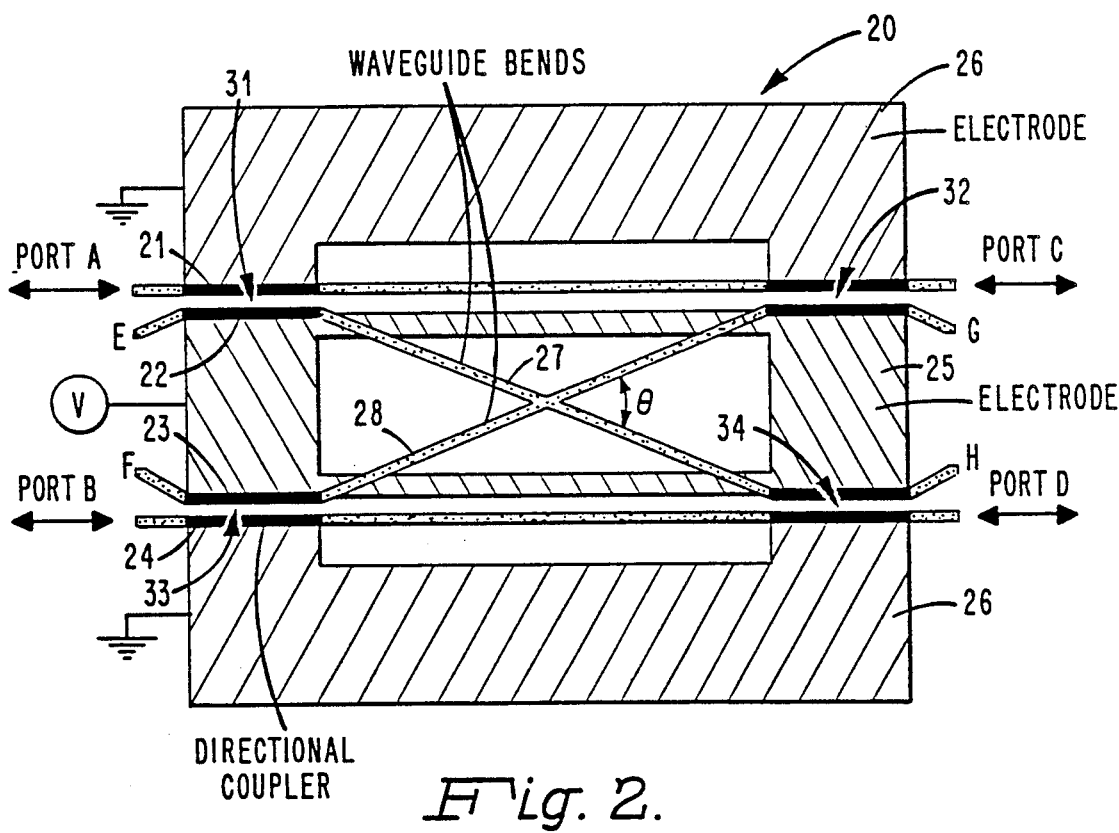
FIG. 2 is a schematic top view of a first embodiment of an integrated optical 2×2 changeover switch having a twofold extinction ratio, according to the invention.

FIG. 2 is a schematic top view of a first embodiment of an integrated optical 2×2 changeover switch 20 incorporating the principles of this invention, using directional couplers and having a twofold extinction ratio for both the bar and the cross states. In this context, a "twofold" extinction ratio means that the extinction ratio (expressed in dB) a switch fabricated according to this design is double that of a conventional integrated optical 2×2 changeover switch of the prior art. In the figures, the thick lines, both black and speckled, represent optical waveguides fabricated on integrated optical substrates such as LiNbO, GaAs or InP. The black lines represent optical coupling regions and the speckled lines represent passive waveguides that could be low-loss waveguide bends.

As shown in the embodiment of FIG. 2, four waveguides 21, 22, 23 and 24 having ports at each end and two electrodes 25, 26 of opposite polarity comprise switch 20. Waveguides 21, 24 terminate at both ends with ports A, C and B, D, respectively. Waveguides 12, 13 terminate at both ends with waveguide bends leading to ports E, G and F, H, respectively. Two sections of these waveguides are positioned very close to each other in four areas 31, 32, 33, and 34 of the schematic diagram such that each area contains a directional coupler switch. Waveguide bends 27, 28 intersect at angle $\theta$, this angle being calculated to insure that loss and crosstalk are negligible. Although switch 20 consists of four waveguide directional couplers 31, 32, 33, 34, only one pair of electrodes 25, 26 is used for all of these couplers. Therefore, the same electrical signal source is used to control all couplers whose responses or switched states are expected to be the same. This is in contrast to existing optical matrix switches in which each directional coupler has its own pair of electrodes.

Switch 20 uses four ports, A, B, C and D, and also has four unused ports E, F, G and H. 2×2 switch 20 is driven to its bar state for port A to communicate with port C and port B to communicate with port D, respectively. In this state, optical signals that leak into the paths of waveguide bends 27, 28 are considered crosstalk, if they are picked up by the undesignated ports. For example, if an optical signal input at port A in the bar state to be outputted at port C leaked into the path of waveguide bend 27 and is picked up at port D, it would be crosstalk since port D is not a designated port for that state. However, since all four directional couplers 31–34 are in their bar states, the crosstalk signals are guided to the unused ports E-H. Continuing the example above, the optical signal leaking from port A into waveguide bend 27 would enter directional coupler 34 in its bar state and therefore would be guided straight through coupler 34 to unused port H.

On the other hand, 2×2 switch 20 is driven to its cross state for port A to communicate with port D and port B to communicate with port C, respectively. In this state, since all four directional couplers 31–34 are also in their cross states, the crosstalk signals are again guided to the unused ports E-H. Thus, an optical signal traversing from one designated port to another designated port must traverse two directional couplers. The result is that the extinction ratio dB switch 20 is doubled for both its bar and its cross states, compared to the extinction ratio of comparable prior art optical switches.

The same principles can be applied to design integrated optical switches with emphasized extinction ratios in either the bar state or the cross state. For example, FIG. 3 and FIG. 4 are schematic diagrams which represent embodiments of integrated optical switch designs having threefold extinction in the cross state and twofold extinction in the bar state, and vice versa, respectively.

Figure 3:
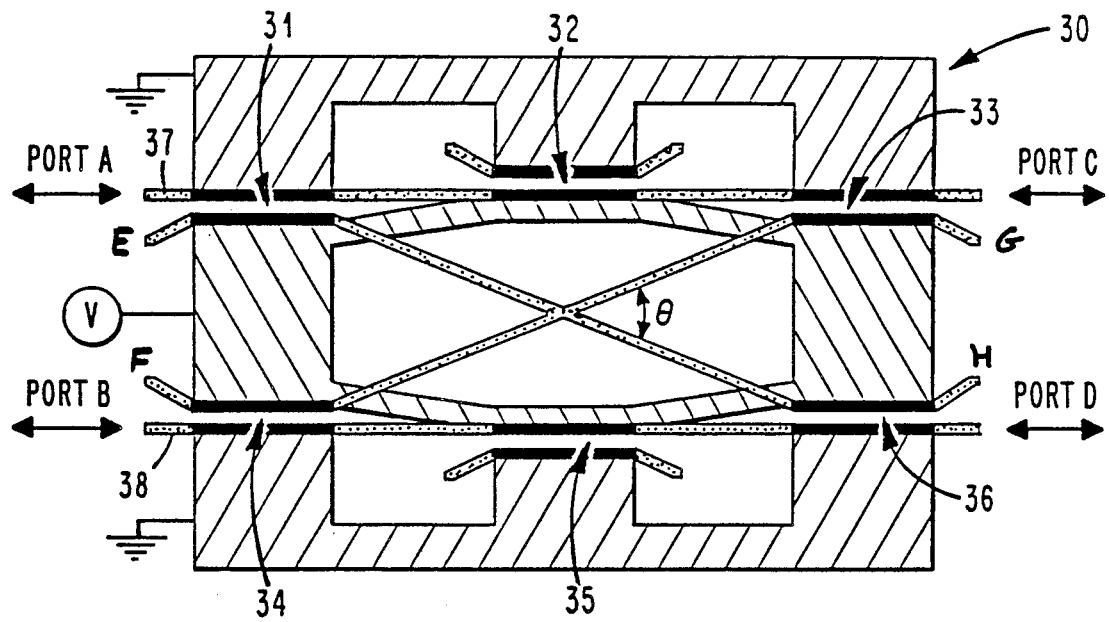
FIG. 3 is a schematic top view of a second embodiment of an integrated optical 2×2 changeover switch having a threefold extinction ratio in the cross state and a twofold extinction ratio in the bar state, according to the invention.

The embodiment of integrated optical switch 30 in FIG. 3 has three cascaded directional couplers 31, 32, 33 between ports A and C, and three cascaded directional couplers 34, 35, 36 between ports B and D. But it has only two cascaded directional couplers between designated ports in the cross state. Hence, in the cross state, crosstalk can be directed to unused ports through three cascaded directional couplers in either straight-through path, resulting in a threefold extinction. In the bar state, there is only a twofold extinction.

Figure 4:
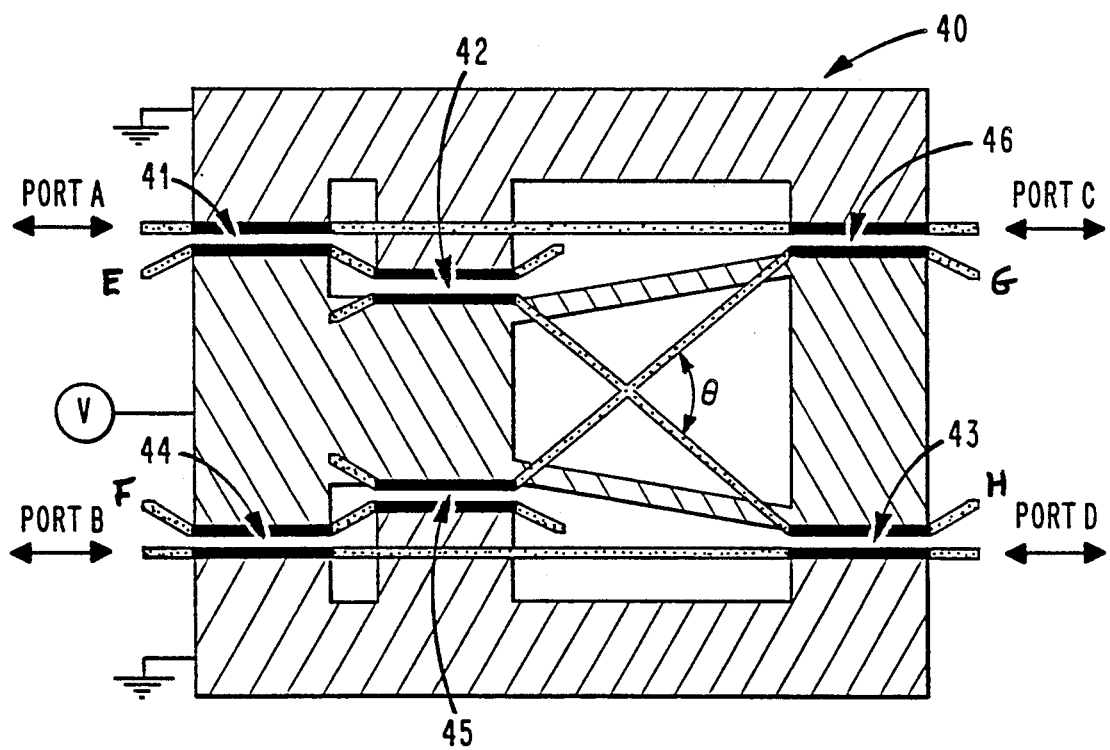
FIG. 4 is a schematic top view of a third embodiment of an integrated optical 2×2 changeover switch having a threefold extinction ratio in the bar state and a twofold extinction ratio in the cross state, according to the invention.

The embodiment of integrated optical switch 40 in FIG. 4 has three cascaded directional couplers 41, 42 and 43 between ports A and D, and three cascaded directional couplers 44, 45, 46 between ports B and C; while it has only two cascaded directional couplers 41, 46 between ports A and C and two cascaded directional couplers 44, 43 between ports B and D. Hence, in the bar state, crosstalk can be directed to unused ports through three cascaded waveguide directional couplers in either crossover path, resulting in a threefold extinction. In the cross state, there is only a twofold extinction.

Figure 5:
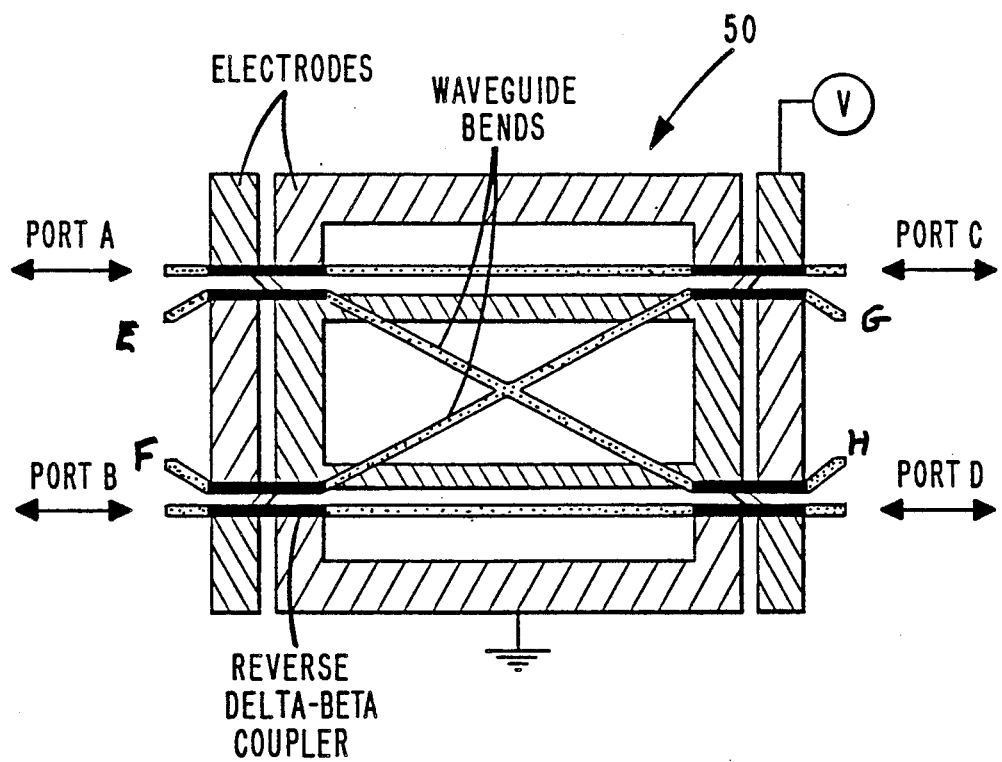
FIG. 5 is a schematic top view of a fourth embodiment of an integrated optical 2×2 changeover switch having a twofold extinction ratio and using reverse delta-beta couplers, according to the invention.

The embodiments of 2×2 integrated optical switches shown in FIGS. 2, 3 and 4 use directional couplers as building blocks. In fact, any integrated optical switches with simple structures can be used as building blocks for switches within the scope of this invention. For example, the directional couplers can be replaced by reverse delta-beta couplers, as illustrated in FIG. 5. Switch 50 of FIG. 5 is essentially the same as switch 20 of FIG. 2, except for the reverse delta-beta electrode pattern. Cross switches and mode-sorting switches may also be used. In all cases, the designs illustrated in the various embodiments yield the same improvement in extinction ratios.

Using current LiNbO, technology, directional coupler switches with extinction ratios greater than 25 dB can be fabricated in quantity without major difficulties. It is therefore possible to fabricate integrated optical 2×2 changeover switches with extinction ratios higher than 50 dB using the circuitry of this invention.

The integrated optical 2×2 switches of this invention can be implemented on any material systems suitable for integrated optics, such as lithium niobate, III–V compound semiconductors, silica glass and organic polymers. The control mechanism can use thermal, magnetooptic or nonlinear effects on optical materials in place of electrooptic effect.

In summary, the integrated optical circuitry of this invention can be used to fabricate very high extinction 2×2 changeover switches using current processing technology. The improvement in extinction ratio expressed in dB can be a factor of 2, 3, 4, or more times present extinction ratios for either or both operational states of the 2×2 changeover switches. If, for example, using conventional designs and current processing technologies one can fabricate integrated optical 2×2 changeover switches with extinction ratios greater than X dB, then using this invention one can fabricate the same type of switches with extinction ratios greater than 2X, 3X or 4X dB.

I claim:

1. A 2×2 integrated optical changeover switch having a very high extinction ratio, comprising:

a first waveguide coupler having a port at a first end thereof serving as a first port of said switch, an unused port at said first end, and first and second ports at a second end thereof;

a second waveguide coupling having a first port at a first end connected by a passive waveguide to said first port at said second end of said first waveguide coupler, and having a first port at a second end serving as the second port of said switch, and a second unused port at said second end;

a third waveguide coupler having a first port at a first end thereof serving as a third port of said switch, an unused port at said first end, and first and second ports at a second end thereof;

a fourth waveguide coupler having a first port at a first end connected by a waveguide to said first port at said second end of said third waveguide coupler, and having a first port at a second end serving as a fourth port of said switch, and an unused port at said second end;

said second port at said second end of said first waveguide coupler being connected by a waveguide to said second port at said first end of said fourth waveguide coupler;

said second port at said second end of said third waveguide coupler being connected to said second port at said first end of said second waveguide coupler;

a first electrode of a first polarity;

a second electrode of a second polarity;

said first and second electrodes controlling operation of all four of said waveguide couplers so that their switched states are the same; such that said first and said second waveguide couplers are cascaded to form a straight-through path between said first and said second ports of said switch;

said third and said fourth waveguide couplers are cascaded to form a straight-through path between said third and said fourth ports of said switch;

said first and said fourth waveguide couplers are cascaded to form a changeover path between said first and said fourth ports of said switch; and said second and said third waveguide couplers are cascaded to form a changeover path between said second and said fourth ports of said switch;

whereby in the bar state crosstalk on said changeover paths is dissipated through said cascaded structure and guided to said unused ports and in the cross state crosstalk on said straightthrough paths is dissipated in said cascaded structure and guided to said unused ports; and whereby the extinction ratio of a path from a port on first side of said switch to a port on a second side of said switch is the sum of the extinction ratios expressed in dB of the cascaded waveguide couplers in said crosstalk path to the second port on said second side of said switch.

2. The 2×2 integrated optical changeover switch of claim 1 wherein said waveguide couplers are directional couplers.

3. The 2×2 integrated optical changeover switch of claim 1 wherein said waveguide couplers are reverse delta-beta couplers.

4. The 2×2 integrated optical changeover switch of claim-further comprising:
    means to increase the extinction ratio of at least one state of said switch to provide an emphasized extinction ratio.

5. The 2×2 integrated optical changeover switch of claim 4 wherein said means to increase the extinction ratio comprises:
    at least one additional waveguide coupler positioned on the path of crosstalk between two cascaded waveguide couplers at each end of said path, thereby providing additional cascaded structures to dissipate said crosstalk.

6. A 2×2 integrated optical changeover switch having a very high extinction ratio, comprising:
    a first waveguide having a first end section at a first end, a second end section at a second end, and an intermediate section positioned between said first and second end sections;
    a first port of said switch at the beginning of said first end section of said first waveguide;
    a second port of said switch at the end of said second end section of said first waveguide;
    a first electrode of a first polarity adjacent said first and second end sections of said first waveguide;
    a second waveguide having a first end section at a first end positioned in close proximity to said first end section of said first waveguide, a second end section at a second end, and an intermediate section between said end sections, each end section terminating in an unused port;
    a second electrode of a second polarity, opposite said first polarity, adjacent said first end section of said second waveguide;
    said first end sections of said first waveguide and said second waveguide together with said first and second electrodes positioned adjacent thereto constituting a first integrated waveguide coupler;
    a third waveguide having a first end section at a first end, a second end section positioned in close proximity to said second end section of said first waveguide at a second end, and an intermediate section between said first and second end sections, each end section terminating in an unused port;
    said second electrode being also adjacent said second end section of said third waveguide;
    said second end section of said first waveguide and said second end section of said second waveguide together with said first and second electrodes positioned adjacent thereto constituting a second waveguide coupler;
    a fourth waveguide having a first end section at a first end positioned in close proximity to said first end section of said third waveguide, a second end section at a second end positioned in close proximity to said second end section of said second waveguide, and an intermediate section between said end sections;
    a third port of said switch at first end of said fourth waveguide and a fourth port of said switch at said second end of said fourth waveguide;
    said first electrode positioned adjacent said fourth integrated waveguide;
    said first end section of said third waveguide and said first end section of said fourth waveguide together with said first and said second electrodes positioned adjacent thereto constituting a third waveguide coupler;
    said second end section of said second waveguide and said second end section of said fourth waveguide together with said first and second electrodes positioned adjacent thereto constituting a fourth waveguide coupler; such that
    said first and second electrodes control the operation of all four of said waveguide couplers so that their switched states are the same;
    said first and said second waveguide couplers are cascaded to form a straight-through path between said first and said second ports of said switch;
    said third and said fourth waveguide couplers are cascaded to form a straight-through path between said third and said fourth ports of said switch;
    said first and said fourth waveguide couplers are cascaded to form a changeover path between said first and said fourth ports of said switch; and
    said second and said third waveguide couplers are cascaded to form a changeover path between said second and said fourth ports of said switch;
    whereby in the bar state crosstalk on said changeover paths is dissipated through said cascaded structure and guided to said unused ports and in the cross state crosstalk on said straight-through paths is dissipated in said cascaded structure and guided to said unused ports; and
    whereby the extinction ratio of a path from a port on a first side of said switch to a port on a second side of said switch is the sum of the extinction ratios expressed in dB of the cascaded waveguide couplers in said crosstalk path to the second port on said second of said switch.

7. The 2×2 integrated optical changeover switch of claim 6 wherein said waveguide couplers are directional couplers.

8. The 2×2 integrated optical changeover switch of claim 6 wherein said waveguide couplers are reverse delta-beta couplers.

9. The 2×2 integrated optical changeover switch of claim 6 further comprising:

means to increase the extinction ratio of at least one state of said switch to provide an emphasized extinction ratio.

10. The 2×2 integrated optical changeover switch of claim 9 wherein said means to increase the extinction ratio comprises:

at least one additional waveguide coupler positioned on the path of crosstalk between two cascaded waveguide couplers at each end of said path, thereby providing additional cascaded structures to dissipate said crosstalk.

* * * * *